United States Patent

Subramaniam et al.

Patent Number: 6,070,187
Date of Patent: May 30, 2000

[54] METHOD AND APPARATUS FOR CONFIGURING A NETWORK NODE TO BE ITS OWN GATEWAY

[75] Inventors: Sundararajan Subramaniam, Roseville; Paul T. Congdon, Granit Bay, both of Calif.

[73] Assignee: Hewlett-Packard Company, Palo Alto, Calif.

[21] Appl. No.: 09/048,934

[22] Filed: Mar. 26, 1998

[51] Int. Cl.$^7$ .................................................. G06F 15/177
[52] U.S. Cl. .......................................... 709/220; 709/221
[58] Field of Search ...................................... 709/220, 221, 709/222, 246, 250, 238, 249, 236; 370/351, 401, 409

[56] References Cited

U.S. PATENT DOCUMENTS

| | | | |
|---|---|---|---|
| 5,649,100 | 7/1997 | Ertel et al. | 709/201 |
| 5,918,016 | 6/1999 | Brewer et al. | 709/220 |
| 5,920,699 | 7/1999 | Bare | 709/225 |

OTHER PUBLICATIONS

G. McGregor, "The PPP Internet Protocol Control Protocol (IPCP)" Network Working Group, RFC 1172 pp. 1–11, May 1992.

*Primary Examiner*—Mehmet B. Geckil
*Attorney, Agent, or Firm*—David A. Plettner

[57] ABSTRACT

A configuration agent allows a network node seeking to be automatically configured with an IP address and a default gateway address to be configured as its own gateway. In first and second embodiments of the present invention, the configuration agent resides on a network device (such as a switch or bridge) that is coupled to two network segments, with one network segments including a node to be configured and another network segment including a server capable of automatically providing configuration parameters. In the first embodiment, the configuration agent acts as a snoopy agent. Messages from the configuration server to the node to be configured are "snooped" to discover messages containing an IP address and a default gateway address. Such messages are altered to copy the IP addresses offered to the nodes seeking configuration to the default gateway addresses, and the messages are sent on their way, thereby causing the node seeking to be configured to be its own default gateway. In the second embodiment of the invention, the configuration acts as a proxy agent. From the point of view of the node to be configured, the proxy agent appears to be a configuration agent. From the point of view of the configuration server, the proxy agent appears to be a relay agent if the configuration server and the node to be configured are on different subnets. When the configuration server sends messages to the node to be configured (possibly treating the proxy agent as a relay agent), the proxy agent intercepts the message and copies the offered IP address to the default gateway address in the message, thereby causing the node seeking to be configured to be configured as its own gateway. The proxy agent also substitutes its IP address for the IP address of the actual configuration server, thereby causing the node seeking to be configured to treat the proxy agent as the configuration agent.

26 Claims, 10 Drawing Sheets

METHOD AND APPARATUS FOR CONFIGURING A NETWORK NODE TO BE ITS OWN GATEWAY

FIELD OF THE INVENTION

The present invention relates to communication between network nodes. More specifically, the present invention relates to a method and apparatus that allows a network node to be automatically configured to be its own default gateway.

DESCRIPTION OF THE RELATED ART

In the art of computer networking, protocol stacks are commonly used to transmit data between network nodes that are coupled by network media such as coaxial cable or twisted-pair wiring. Network nodes include devices such as computer workstations, servers, network printers, network scanners, and the like. To harmonize the development and implementation of protocol stacks, the International Standards Organization (ISO) promulgated an Open System Interconnection (OSI) Reference Model that prescribed seven layers of network protocols.

FIG. 1 is a block diagram 10 of the OSI Reference Model. The model includes a hardware layer 12, a data link layer 14, a network layer 16, a transport layer 18, a session layer 20, a presentation layer 22, and an application layer 24. Each layer is responsible for performing a particular task. Hardware layer 12 is responsible for handling both the mechanical and electrical details of the physical transmission of a bit stream. Data link layer 14 is responsible for handling the packets, including generating and decoding of the address used by the hardware protocol and any error detection and recovery that occurred in the physical layer. For example, in an Ethernet network data link layer 14 is responsible for generating and decoding the media access control (MAC) address. Network layer 16 is responsible for providing connections and routing packets in the communication network, including generating and decoding the address used by upper level protocols and maintaining routing information for proper response to changing loads. For example, in the TCP/IP protocol, network layer 16 is responsible for generating and decoding the IP address. Transport layer 18 is responsible for end-to-end connections between nodes in the network and the transfer of messages between the users, including partitioning messages into packets, maintaining packet order and delivery, flow control, and physical address generation. Session layer 20 is responsible for implementing the process-to-process protocols. Presentation layer 22 is responsible for resolving differences in formats among the various sites in the network, including character conversions and duplex (echoing). Finally, application layer 24 is responsible for interacting directly with the users. Layer 24 may include applications such as electronic mail, distributed data bases, web browsers, and the like.

Before the ISO promulgated the OSI Reference Model, the Defense Advanced Research Projects Agency (DARPA) promulgated the ARPNET Reference Model. The ARPNET reference model includes four layers, a network hardware layer, a network interface layer, a host-to-host layer, and a process/application layer.

As their names imply, the OSI and ARPNET Reference Models provide guidelines that designers of networking communication protocols may or may not choose to follow. However, most networking protocols define layers that at least loosely correspond to a reference model.

In the field of computing, there are many popular protocols used to transmit data between network nodes. For example, TCP/IP, AppleTalk®, NetBEUI, and IPX are all popular protocols that are used to transmit data between servers, workstations, printers, and other devices that are coupled to computer networks.

It is common for several protocols to operate concurrently within a single network node, even if the network node has a single network interface. For example, a typical computer workstation may use TCP/IP to communicate over the Internet, and IPX to communicate with a network server. Likewise, a printer may be configured to receive print jobs using either the AppleTalk® protocol or the NetBEUI protocol. Typically these protocols communicate and interact with lower level hardware protocols. For example, it is common for two computer systems coupled via an Ethernet network to communicate using the TCP/IP protocol. Generally, a software routine existing at data link layer 14 or network layer 16 routes data packets between the network adapter and the proper protocol stack.

Consider a TCP/IP packet transmitted over an Ethernet network. Each packet includes a 48-bit media access control (MAC) address that identifies another node on the Ethernet network. The MAC address is known more generically as a hardware address. The entire Ethernet packet is protected by a cyclic redundancy check (CRC) code that is calculated and stuffed into the Ethernet packet by the sending network adapter. The receiving network adapter decodes the CRC to verify the integrity of the Ethernet packet. If the integrity of the packet cannot be verified, i.e., an error is detected, the packet is discarded. Encapsulated within an Ethernet packet is the IP portion of the TCP/IP protocol, which is known in the art as a "datagram". The datagram includes a 32-bit IP address and a 16 bit checksum code that protects the IP header. The IP is known more generically as a network address. If the integrity of the IP header cannot be verified, the datagram is discarded. The TCP portion of the TCP/IP protocol is encapsulated within the datagram, and has a 16 bit checksum code that protects the TCP header and the contents of the TCP portion of the datagram. If the integrity of the TCP header or the contents of the TCP portion cannot be verified, the datagram is discarded, and the sender will retransmit the packet after not receiving an acknowledge datagram from the intended recipient. Note that this packet contains two addresses, a hardware (Ethernet) address and a network (IP) address. The relationship between these two addresses will be described in greater detail below.

FIG. 2 is a diagram showing a prior art network 26. Network 26 interconnects network nodes 28,30,32,34,36,38, 40,42, and 44. As described above, the network nodes may be devices such as computer workstations, servers, network printers, network scanners, and the like. For the sake of this discussion, it is assumed that the network nodes are equipped with Ethernet network adapters and transmit data using the TCP/IP protocol. Many networks conform to a series of standards promulgated by the Institute of Electrical and Electronics Engineers (IEEE). This series of standards is known in the art as the IEEE 802 family of standards. The IEEE 802 family of standards are hereby incorporated by reference.

The network nodes are coupled together into LAN segments via hubs. All nodes in a LAN segment are in a common collision domain because each node in a LAN segment receives a signal when another node attempts to transmit a packet, and if two nodes in a LAN segment attempt to transmit a packet at the same time, a collision occurs. The Ethernet protocol includes a retransmission algorithm that minimizes the likelihood that another collision will occur when the two nodes attempt to retransmit their respective packets. In FIG. 2, network nodes 28, 30, and 32 are coupled together into LAN segment 48 via hub 46. Likewise, network nodes 34, 36, and 38 are coupled together into LAN segment 52 via hub 50 and network nodes 40, 42, and 44 are coupled together into LAN segment 56 via hub 54.

Switches and bridges are used to interconnect local or remote LAN segments. Switches and bridges form a single logical network (often referred to as a subnet) and operate at data link layer 14 and hardware layer 12 of OSI Reference Model 10. In FIG. 2, switch 58 connects LAN segments 48 and 52. In the Ethernet protocol, packets are addressed by a media access control (MAC) address. Switches and bridges maintain lists of the MAC address of the network nodes on each LAN segment to which they are attached to be able to forward individual packets to the appropriate port within the switch or bridge for routing each packet to the LAN segment containing the node addressed by the MAC address.

While switches and bridges link together LAN segments to form subnets, routers are used to link together subnets via another network, such as the Internet or a wide area network (WAN). Routers may also be used to route packets within a common subnet, which will be described below. Routers maintain tables that associate higher level protocol addresses (such as an IP address) with ports of the router. In contrast to switches and bridges, routers are also capable of viewing the network as a hierarchical topology, wherein large blocks and ranges of addresses are routed to other routers for further routing. For this reason, routers are often used to route packets in very large networks, such as the Internet.

A default gateway is the router to which a node routes a packet when the node cannot determine that an outgoing packet is addressed to a node on the same subnet. A packet transmitted to a default gateway may be processed by several other routers before arriving at the destination node Several protocols have been defined that allow the TCP/IP protocol to operate with lower level hardware protocols, such as the Ethernet protocol. For example, an Ethernet node configured to use TCP/IP is assigned an IP address, a subnet mask, and a default gateway address. The subnet mask identifies IP addresses that are on the same subnet, and the default gateway address identifies a router that processes packets that are not on the same subnet. For packets on the same subnet, the Address Resolution Protocol (ARP) is used to find the IP address of a destination node.

Assume that node 28 has an IP address of 192.44.133.13, and assume that node 30 has an IP address of 192.44.133.25. Further assume that the subnet mask of node 28 is set to 255.255.255.0. To send a packet to node 30, node 28 first does a bit-wise AND of the IP address of node 30 with the subnet mask and compares the result to a bit-wise AND of the IP address of node 28 and the subnet mask. If the results of the two AND operations match, node 30 is on the same subnet as node 28 and the MAC address of node 30 may be found using the ARP. Next, node 28 sends out a broadcast Ethernet packet with its own MAC address and the IP address of node 30 in accordance with the ARP. The Ethernet protocol supports unicast and broadcast packets. A broadcast packet is addressed to and received by all nodes on a subnet, while a unicast packet is addressed to and received by a specific node. Node 30 responds to this message by transmitting a unicast packet containing the MAC address of node 30 back to node 28. Node 28 then transmits the TCP/IP packet to node 30 using the MAC address that it just received from node 30. Furthermore, nodes cache this information for future transmissions, thereby minimizing the need to repeatedly find the MAC address of nodes on the same subnet.

Now assume that node 28, which continues to be configured as above, seeks to send a packet to node 40, which has an IP address of 168.45.198.2. Node 28 determines that node 40 is not on the same subnet based on the subnet mask using the bit-wise AND operations described above. Once this is done, node 28 relays the packet to router 62, which is the default gateway used by node 28 to transmit packets addressed to nodes that node 28 cannot verify are on the same subnet. In turn, router 62 relays the packet to router 68, router 68 relays the packet to router 69, and router 69 relays the packet to router 60. Since router 60 is on the same subnet as node 40 (the destination node), router 60 discovers the MAC address of node 40 using the ARP, readdresses the packet with the MAC address of node 40, and transmits the packet to LAN segment 56, where the packet is received by node 40.

A variety of protocols have been defined that allow a node to be configured with an IP address, subnet mask, the address of a default gateway, as well as other parameters. In the discussion below, the terms "client", "client node", and "node to be configured" will refer to the network node which seeks to obtain configuration parameters for itself. The term "server" will refer to the network node that provides configuration parameters. One simple protocol is the Reverse Address Resolution Protocol (RARP), which is executed over an Ethernet network and converts an Ethernet address to an IP address. The client broadcasts an Ethernet packet with its MAC address and the server responds by transmitting a unicast packet to the client containing the client's IP address. RARP is used mainly by diskless network nodes.

Another protocol standard, Bootstrap Protocol (BOOTP) is commonly used in networks having diskless nodes. BOOTP uses the User Datagram Protocol (UDP). BOOTP allows a node to determine its own IP address, the subnet mask, the default gateway address, the address of a BOOTP server, and a path name that points to a boot file that may be loaded from the BOOTP server when the node boots up. BOOTP also defines BOOTP relay agents, which allow a node seeking configuration parameters to be serviced by a BOOTP server on another subnet. BOOTP is defined in Request For Comment (RFC) 951, which is hereby incorporated by reference.

Network Information Protocol (NIP) also allows a network node to determine its own IP address, and to identify available IP addresses by using a "polling/defense" mechanism whereby network nodes are polled to determine whether IP address, s are in use. Clients defend IP addresses that are in use by responding to the polling messages. When a client issues a message seeking an IP address, the NIP server returns a set of IP addresses available on the network. The client selects one of the IP addresses and double checks to make sure it is available by using ARP. The client then reserves the IP address for itself by responding to the NIP server, which records the allocated IP address.

Finally, Dynamic Host Configuration Protocol (DHCP) is an extension of BOOTP and is described in RFC 1541 and RFC 1533, which are both hereby incorporated by reference. Since DHCP is an extension of BOOTP, it provides all the services provided by BOOTP. It also is capable of providing automatic allocation of IP addresses that have a finite lease (and therefore expire at a later time), automatic allocation of IP addresses having an infinite less (and therefore never expire) and static allocation of IP addresses selected by a network administrator.

Below are the primary messages exchanged in accordance with the DHCP protocol, along with a description of the client-server interaction.

| Message | Use |
| --- | --- |
| DHCPDISCOVER | Client message to locate available servers. |
| DHCPOFFER | Server message to client in response to DHCPDISCOVER. Message includes an offer of configuration parameters. |
| DHCPREQUEST | Client message to DHCP servers requesting offered parameters from one server and implicitly declining offers from all other DHCP servers. |
| DHCPACK | Server message to client with configuration parameters, including committed IP address. |
| DHCPNAK | Server message to client refusing request for configuration parameters. |
| DHCPDECLINE | Client message to server indicating configuration parameters (e.g., IP address) are invalid. |
| DHCPRELEASE | Client message to server relinquishing network address and canceling remaining lease. |

The configuration dialogue between the client and the server begins with the client broadcasting a DHCPDISCOVER message on its local subnet. A BOOTP relay software agent on the subnet may pass the message on to DHCP servers not on the same subnet. Next, each server may respond with a DHCPOFFER message that includes an available network IP address and other configuration parameters. The server unicasts the DHCPOFFER message to the client, if possible, and will use the BOOTP relay agent if necessary. Alternatively, the server may broadcast the message the client's subnet using a broadcast address.

The client then receives one or more DHCPOFFER messages from one or more servers. The client may choose to wait for multiple responses. The client then chooses one server from which to request configuration parameters based on the configuration parameters offered in the DHCPOFFER messages. The client then broadcasts a DHCPREQUEST message that must include a 'server identifier' option to indicate which server the client has selected. This message may include other options that specify desired configuration values.

The servers receive the DHCPREQUEST broadcast from the client, and those servers not selected by the DHCPREQUEST message use the message as notification that the client has declined that server's offer. The server selected by the client in the DHCPREQUEST message then commits the binding for the client and responds with a DHCPACK message containing the configuration parameters. If the selected server is unable to satisfy the DHCPREQUEST message, the server responds with a DHCPNAK message refusing the client's request.

If the client receives a DHCPNAK message, it starts over. If the client receives a DHCPACK message with configuration parameters, the client performs a final check on the parameters, and notes the length of time for which the IP address is valid (the duration of the lease) and a lease identification specified in the DHCPACK message. At this point, the client is configured with a client IP address, a subnet mask, and a default gateway address. If the client detects a problem with the parameters in the DHCPACK message, the client sends a DHCPDECLINE message back to the server and restarts the configuration process. The client may relinquish its lease on an IP address by sending a DHCPRELEASE message to the server. The interaction of messages in the BOOTP protocol is similar.

SUMMARY OF THE INVENTION

The present invention is a configuration agent that allows a network node seeking to be automatically configured with an IP address and a default gateway address to be configured as its own gateway. By configuring a node to be its own default gateway, the node is able to execute a common default gateway routine that processes both on-subnet and off-subnet packets. In contrast, prior art nodes used a subnet mask to determine whether a destination node is on the same subnet. The subnet mask mechanism is less flexible because node addresses must be added to the subnet in powers of two, which is not always practical or possible. While it is desirable to configure a node to be its own gateway, prior art configuration protocols, such as the Dynamic Host Configuration Protocol (DHCP) do not allow a network node to be configured as its own gateway. The present invention solves this problem.

In a first and a second embodiment of the present invention, the configuration agent resides on a network device (such as a switch or bridge) that is coupled to two network segments, with one network segments including a node to be configured and another network segment including a server capable of automatically providing configuration parameters.

In the first embodiment of the invention, the configuration agent acts as a snoopy agent. Messages from the configuration server to the node to be configured are "snooped" to discover messages containing an IP address and a default gateway address. Such messages are altered to copy the IP addresses offered to the nodes seeking configuration to the default gateway addresses, and the messages are sent on their way, thereby causing nodes seeking to be configured to be configured as their own default gateway. In some configurations, messages from the node to be configured to the configuration server are altered to ensure that messages from the configuration server to the node seeking to be configured are broadcast messages.

In the second embodiment of the invention, the configuration acts as a proxy agent. From the point of view of the node seeking to be configured, the proxy agent appears to be a configuration agent. From the point of view of the configuration server, the proxy agent appears to be a relay agent if the configuration server and the node seeking to be configured are on different subnets. If they are on the same subnet, the proxy agent processes messages from the configuration server to the node seeking to be configured in a manner similar to the snoopy agent.

When the node seeking to be configured sends messages indicating that it wishes to be configured with an IP address and a default gateway, the proxy agent receives the messages. Based on the configuration of the second embodiment, the proxy agent may alter the messages to request unicast or broadcast responses from the server. In addition, if the node to be configured and the configuration agent are not on the same subnet, the message will be altered to cause the configuration server to treat the proxy agent as a relay agent.

When the configuration server sends messages to the node to be configured (possibly treating the proxy agent as a relay agent), the proxy agent intercepts the message and copies the offered IP address to the default gateway address in the message, thereby causing the node seeking to be configured to be configured as its own gateway. The proxy agent also substitutes its IP address for the IP address of the actual configuration server, thereby causing the node seeking to be configured to treat the proxy agent as the configuration agent.

DETAILED DESCRIPTION OF THE PREFERRED EMBODIMENTS

Figure 1:
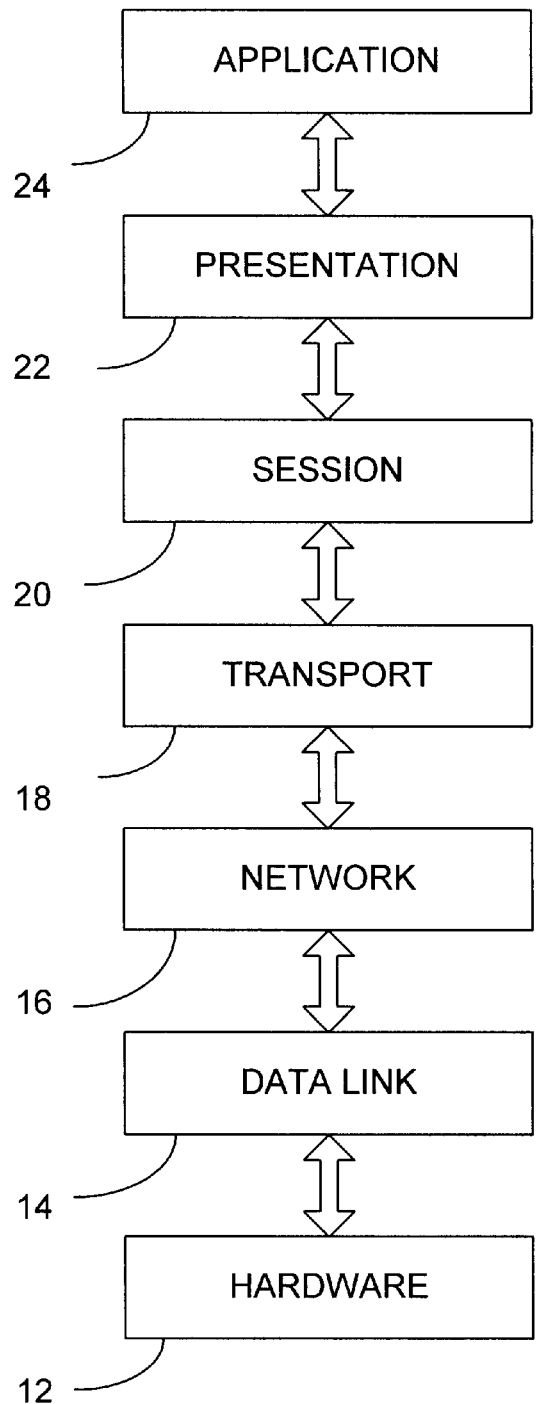
FIG. 1 is a block diagram of the Open System Interconnection (OSI) Reference Model.
Figure 2:
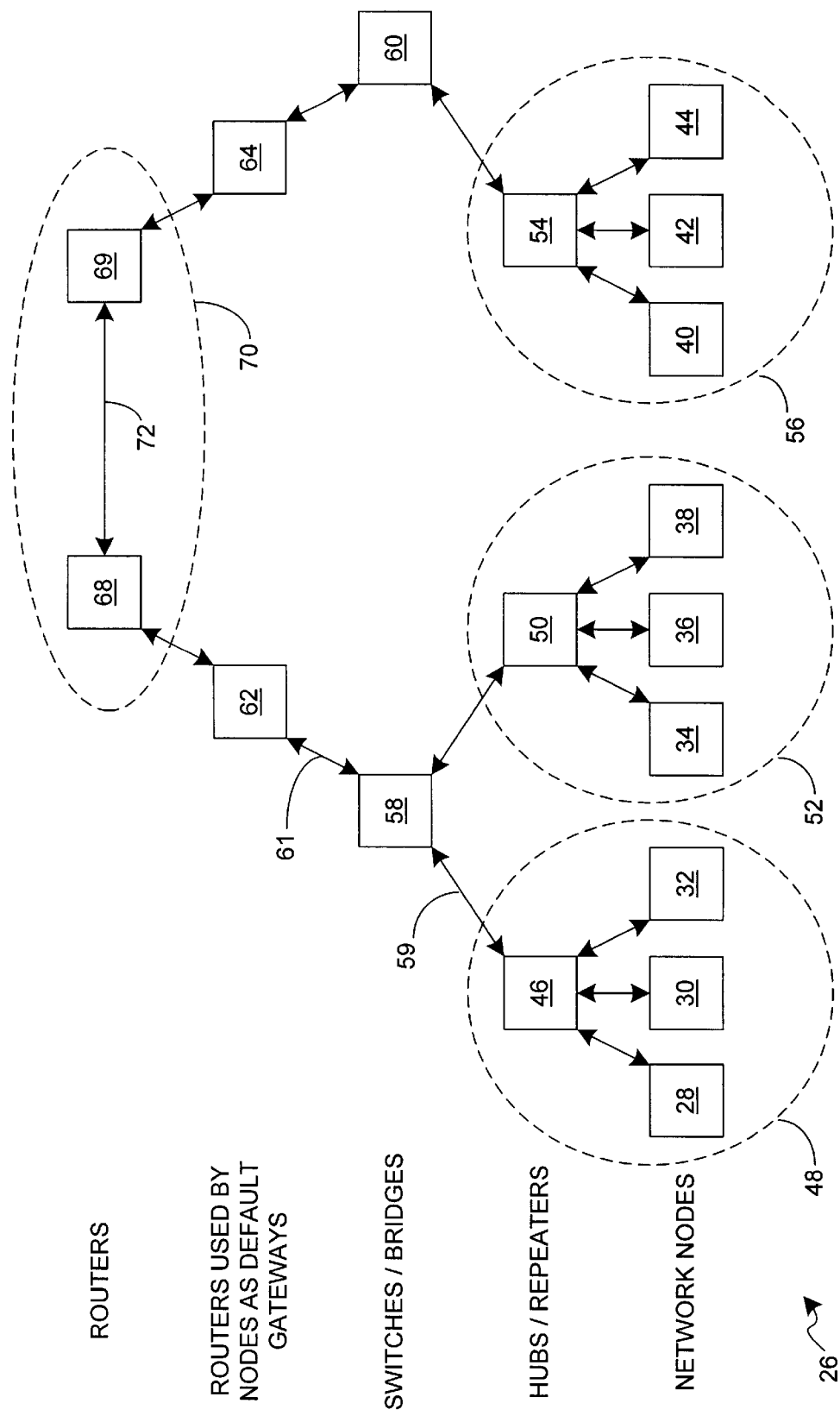
FIG. 2 is a diagram showing a prior art network.

The present invention is a configuration agent that resides on a network device, such as a switch. The configuration agent allows a network node that is seeking configuration parameters to be configured as its own default gateway for the purpose of communicating directly with nodes that are on the same subnet, even though a subnet mask may indicate that the nodes may be on different subnets. Before discussing the present invention in greater detail below, it is helpful to understand some current trends in the art of computer networking.

Traditionally, large TCP/IP networks have often used routers to transmit packets between network nodes. However, compared to switches, routers are relatively slow and processor intensive. In addition, routers are significantly more expensive than switches.

As discussed above, two TCP/IP nodes connected via an Ethernet network can communicate directly without a router provided that the subnet mask of a sending node indicates that the destination IP address is on the same Ethernet network. The sending node performs a bit-wise AND operation with the subnet mask and its IP address and compares the result to a bit-wise AND of the subnet mask and the destination IP address. If the results match, the sending node uses the Address Resolution Protocol (ARP) to convert the IP address to an Ethernet address before sending out a TCP/IP packet. As used her(in, the term "hardware address" will refer to a lower level address used by the networking hardware, such as an Ethernet MAC address. The term "network address" will refer to the address used at higher levels of the protocol stack, such as an IP address.

The subnet mask is a relatively crude mechanism. IP addresses can only be added to the network in powers of two. Accordingly, if a subnet mask is set 255.255.252.0, 1024 unique IP addresses are available on the network, and nodes assigned these addresses may communicate directly with each other without requiring a router. However, if a network administrator wishes to add more IP addresses, one of the bits in the subnet mask must be cleared, thereby providing 2048 unique address. In many situations, all of these addresses may not be available. Therefore, the network administrator is forced to configure TCP/IP to transmit certain packets to a router identified by a default gateway address, even though the destination nodes addressed by the packet are on the same subnet. In fact, to minimize configuration problems, many network nodes are simply configured to transmit all TCP/IP packets to the default gateway.

One solution to this problem is to configure the default gateway address of each node to the IP address of the node itself. Therefore, when a network node seeks to send a TCP/IP packet, a gateway subroutine on the network node routes the packet. The gateway subroutine uses ARP to find the MAC address to which the packet should be routed. Note that routers and switches can be configured to include an ARP proxy server. With respect to a switch, an ARP proxy server simply reduces network traffic by caching the MAC-to-IP address mapping of all nodes on the subnet. Accordingly, when a node attempts to find the IP address of a remote node on the same subnet and broadcasts an ARP request packet, the packet is only transmitted within the LAN segment. An ARP proxy server is not required when LAN segments are coupled together into a subnet via switches. However, without ARP proxy servers on the switches, ARP broadcasts are transmitted to all nodes on the subnet, thereby increasing network traffic. When the gateway subroutine uses ARP to find the MAC address of a remote node on another LAN segment and the switch has an ARP proxy server, the ARP proxy server provides the MAC address of the remote node.

In contrast, an ARP proxy server on a router is necessary if nodes on different subnets are to communicate using ARP. The router's ARP proxy server maintains correspondence between MAC address and IP address. However for off-subnet nodes, the MAC address provided by the router's ARP proxy server is the MAC address of the router itself. When the gateway subroutine uses ARP to find the MAC address of a remote node on another subnet, the router's ARP proxy server responds with the MAC address of the router, thereby causing the packet to be sent to the router for further routing.

Since the ARP is used to resolve all IP addresses, all packets on the same subnet are routed by switches, and a router is only used to transmit packets that are truly off the Ethernet network. TCP/IP packets transmitted within the network are transmitted more quickly because switches are faster than routers. Compared to the subnet mask mechanism, the gateway subroutine is not limited to adding IP addresses in powers of two. Thor do added ranges have to be contiguous. Therefore, the network administrator has more flexibility in assigning IP addresses to an Ethernet network.

In pursuing this approach, one problem the network administrator faces is configuring each network node to be its own gateway. Of course this can be done manually, but this is not an adequate solution for novice users. In addition, this may not be an acceptable solution for networks with many nodes.

To simplify network administration, many network administrators have moved to an automatic host configuration protocol, such as the Bootstrap Protocol (BOOTP) or the Dynamic Host Configuration Protocol (DHCP). Unfortunately, these protocols do not support configuring a network node to be its own gateway. After a network administrator has undertaken the task of establishing an automatic host configuration protocol server, and has configured all network nodes to receive configuration parameters from the server, the administrator is not likely to return to manual configuration.

The present invention solves this dilemma. In one embodiment, a switch (or similar network device) includes a DHCP snoopy agent. The snoopy agent snoops packets transmitted through the switch and watches for DHCP configuration messages. When the snoopy agent detects a message bound for a network node and containing configuration parameters, the agent copies the field containing the candidate IP address into the field that contains the default gateway. The snoopy agent then sends the packet on its way, thereby causing the default gateway IP address stored on the network node to be set to the IP address of the node itself.

In a second, more sophisticated embodiment, a switch (or similar device) includes a DHCP proxy agent. From the point of view of the network node seeking configuration information, the proxy agent appears to be a DHCP server. From the point of view of the DHCP server, the proxy agent appears to be a DHCP/BOOTP relay agent if the client to be configured and the DHCP server are on different subnets. If the client and server are on the same subnet, the proxy agent processes messages from the server to the client in a manner similar to the snoopy agent. DHCP/BOOTP relay agents are known in the art and are used to relay configuration parameters between networks. Since the proxy agent stands between the network node seeking configuration parameters and the DHCP server, the proxy agent is in a position to alter the messages being transmitted to and from the DHCP server by copying the field containing the candidate IP address into the field that contains the default gateway. Both embodiments will be described in greater detail below.

The present invention will be described with reference to the Dynamic Host Configuration Protocol. However, the invention is not limited to DHCP. Those skilled in the art will recognize that the present invention may be applied to other similar protocols, such as the Bootstrap Protocol. The format of a DHCP message is listed below/ in Table 1. The format is derived from RFC 1541, which was incorporated by reference above along with RFC 1533 and RFC 951.

TABLE 1

```
 0                   1                   2                   3
 0 1 2 3 4 5 6 7 8 9 0 1 2 3 4 5 6 7 8 9 0 1 2 3 4 5 6 7 8 9 0 1
      OP (1)          HTYPE (1)       HLEN (1)        HOPS (1)
                              XID (4)
           SECS (2)                        FLAGS (2)
                             CIADDR (4)
                             YIADDR (4)
                             SIADDR (4)
                             GIADDR (4)
                             CHADDR (16)
                              SNAME (64)
                              FILE (128)
                             OPTIONS (312)
```

The fields are defined as follows:

| FIELD | OCTETS | DESCRIPTION |
| --- | --- | --- |
| OP | 1 | Message op code/message type. 1 = BOOTREQUEST, 2 = BOOTREPLY |
| HTYPE | 1 | Hardware address type, e.g., '1' = 10 mb Ethernet. |
| HLEN | 1 | Hardware address length (e.g. '6' for 10 mb Ethernet). |
| HOPS | 1 | Client sets to zero, optionally used by relay-agents when booting via a relay-agent. |
| XID | 4 | Transaction ID, a random number chosen by the client, used by the client and server to associate messages and responses between a client and a server. |
| SECS | 2 | Filled in by client, seconds elapsed since client started trying to boot. |

-continued

| FIELD | OCTETS | DESCRIPTION |
| --- | --- | --- |
| FLAGS | 2 | Flags. Includes broadcast (B) flag. |
| CIADDR | 4 | Client IP address; filled in by client in DHCPREQUEST if verifying previously allocated configuration parameters. |
| YIADDR | 4 | 'your' (client) IP address. |
| SIADDR | 4 | IP address of next server to use in bootstrap; returned in DHCPOFFER, DHCPACK and DHCPNAK by server. |
| GIADDR | 4 | Relay agent IP address, used in booting via a relay-agent. |
| CHADDR | 16 | Client hardware address. |
| SNAME | 64 | Optional server host name, null terminated string. |
| FILE | 128 | Boot file name, null terminated string; "generic" name or null in DHCPDISCOVER, fully qualified directory-path name in DHCPOFFER. |
| OPTIONS | 312 | Optional parameters field. Includes IP address of default gateway. |

Figure 3:
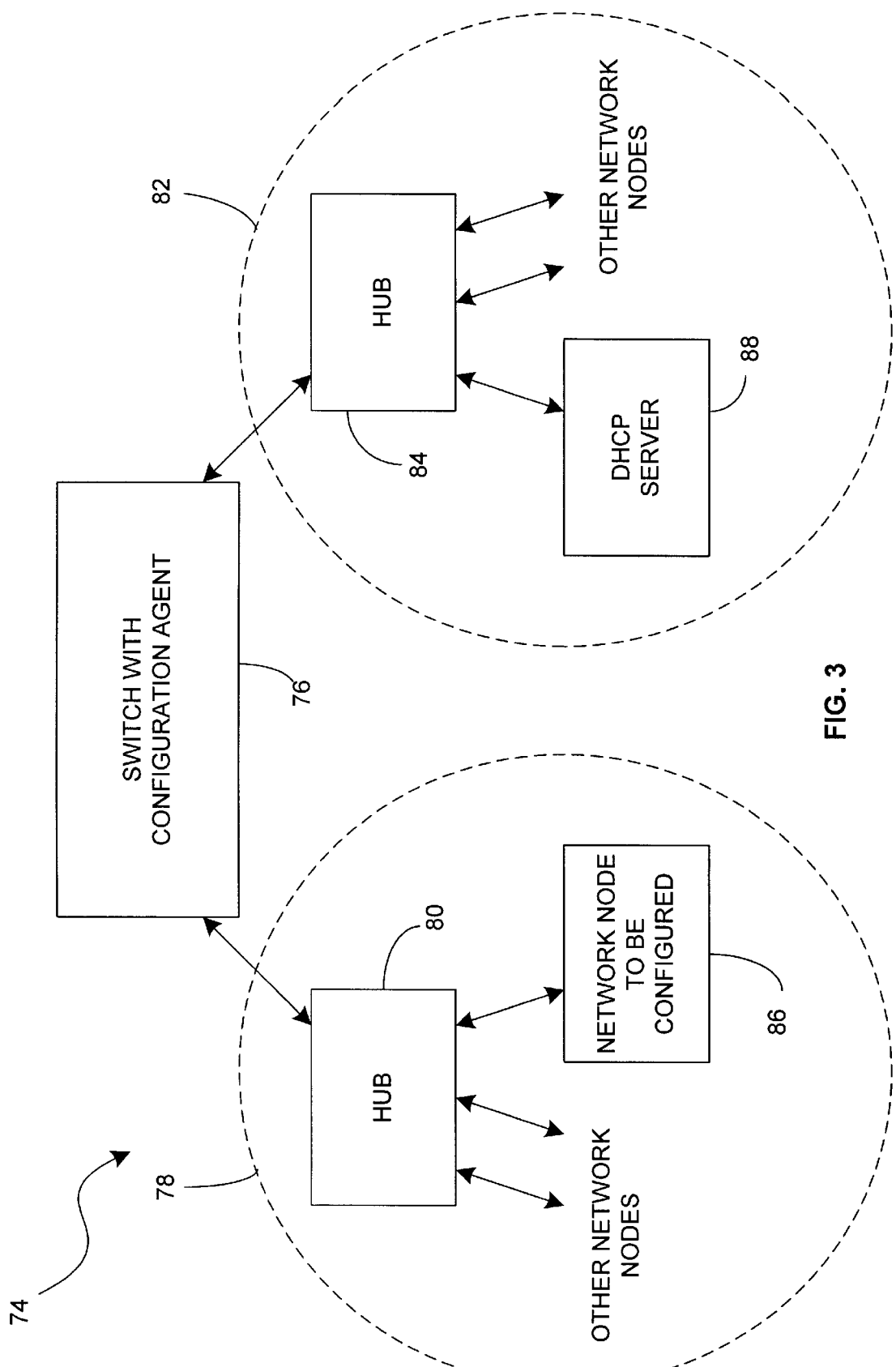
FIG. 3 shows a network that includes a switch having a configuration agent in accordance with the present invention.

FIG. 3 shows a network 74 that includes a switch 76 having a configuration agent in accordance with the present invention. FIG. 3 is generic to both the first embodiment of the present invention, wherein the configuration agent is a DHCP snoopy agent, and the second embodiment of the invention, wherein the configuration agent is a DHCP proxy agent.

Switch 76 couples LAN segment 78 to LAN segment 82 via hub 80 and hub 84, respectively. LAN segment 78 includes a network node 86 that is seeking to be configured, and LAN segment 82 includes a DHCP server 88 that provides configuration parameters. In both configurations of the present invention, the configuration agent on the switch alters the interaction between node 86 and server 88. Therefore, switch 76 is preferably positioned between node 86 and server 88 so that the communication path between node 86 and server 88 flows through switch 76.

Figure 4:
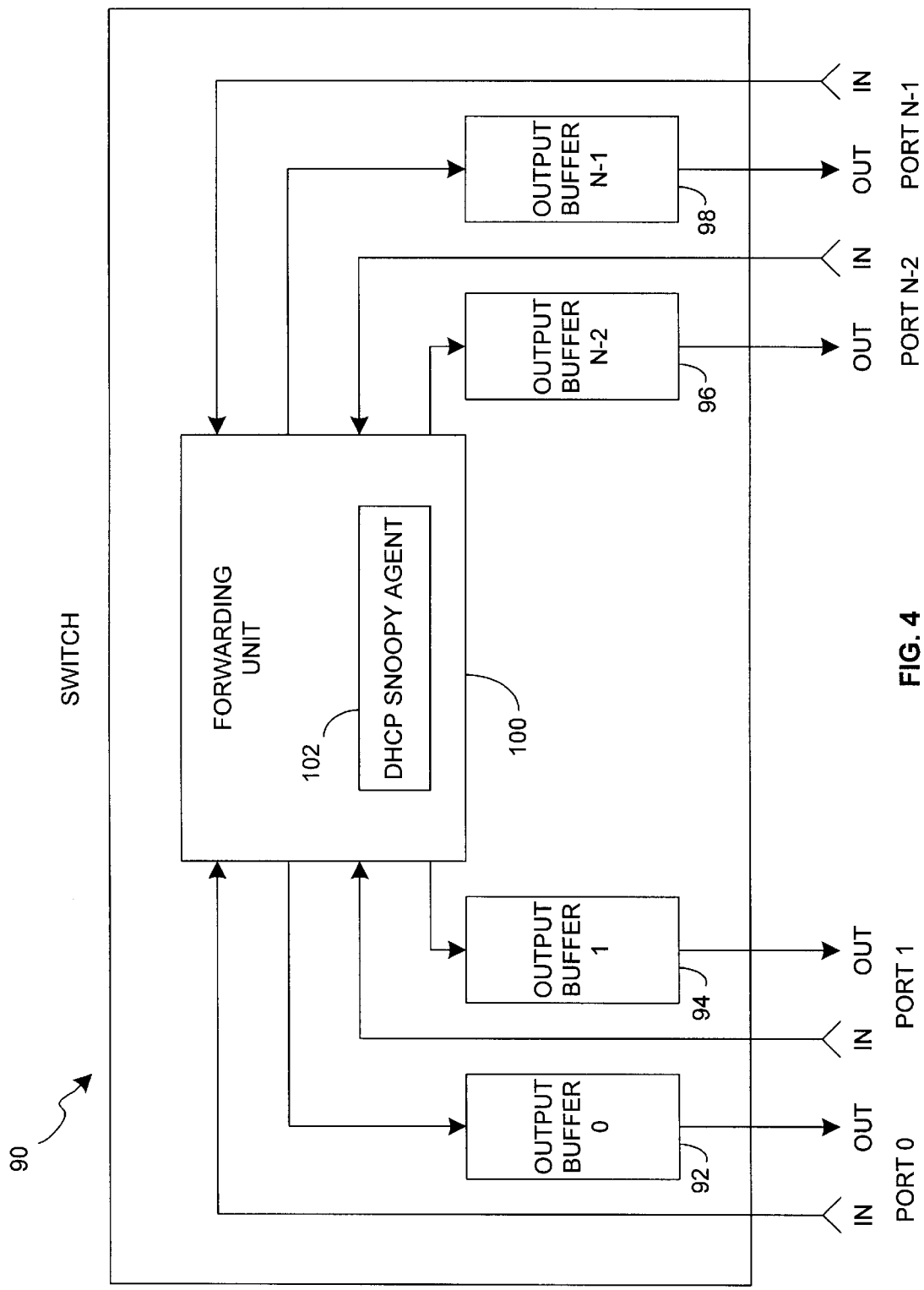
FIG. 4 shows an N-port switch in accordance with a first embodiment of the present invention wherein the configuration agent is a Dynamic Host Configuration Protocol (DHCP) snoopy agent.

FIG. 4 shows an N-port switch 90 in accordance with the first embodiment of the present invention. Each port has an input path to forwarding unit 100, and an output path that includes an output buffer, such as output buffers 92, 94, 96, and 98. Furthermore, forwarding unit 100 includes a DHCP snoopy agent 102. Except as discussed below, forwarding unit 100 forwards packets in a maimer known in the prior art.

Figure 5:
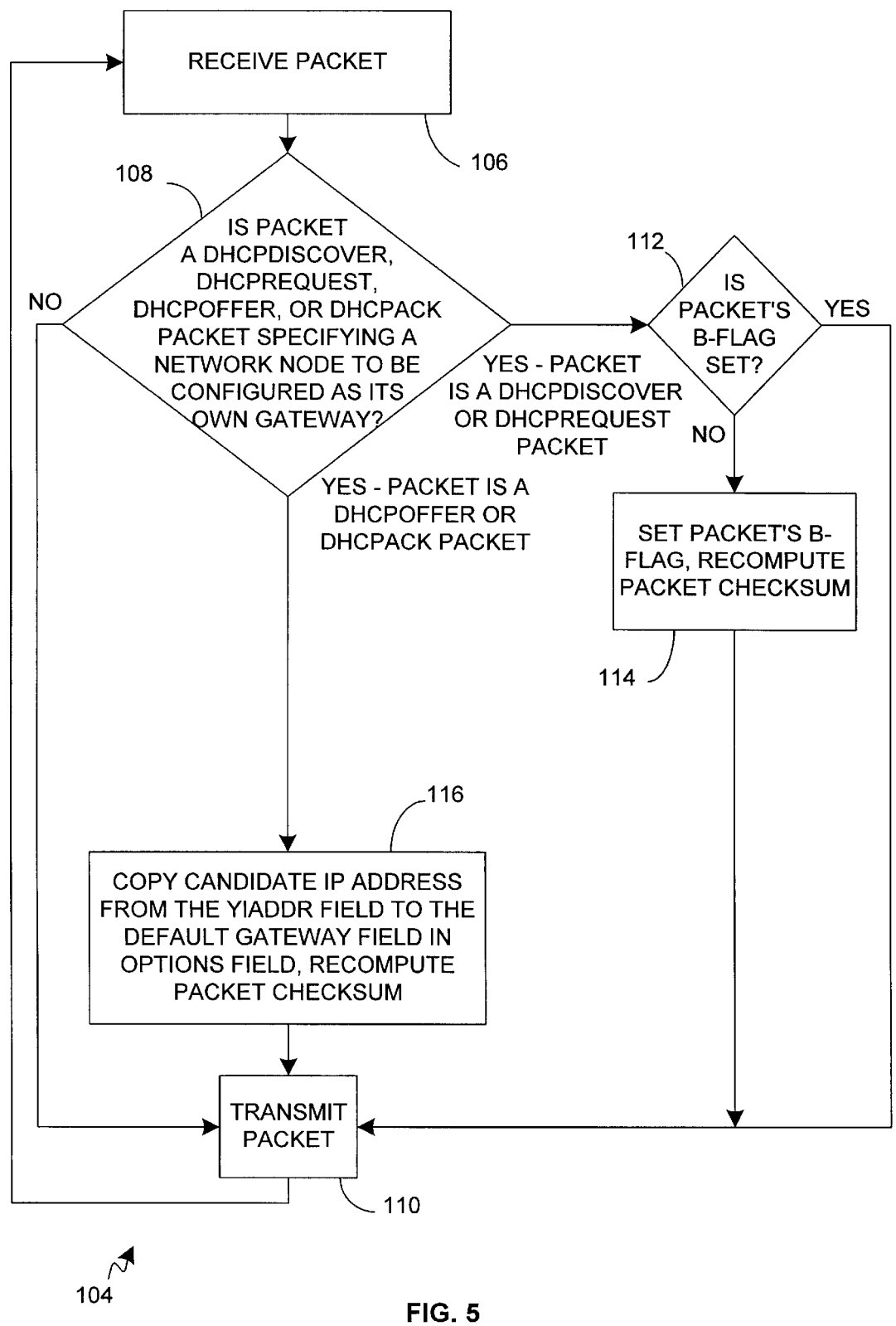
FIG. 5 is a flow chart that illustrates how the DHCP snoopy agent shown in FIG. 4 processes packets.

FIG. 5 is a flow chart 104 that illustrates how DHCP snoopy agent 102 processes packets. At block 106, the packet is received. Block 108 determines whether the packet is a DHCPDISCOVER, DHCPREQUEST, DHCPOFFER, or DHCPACK packet specifying a network node to be configured as its own gateway. Note that in one configuration of the present invention, switch 90 may be configured to only "help" nodes having certain MAC addresses by maintaining a table of nodes to be "helped". In other words, it may be desirable to have some nodes be configured as their own gateways, while other nodes may be configured in accordance with the prior art. If the packet is not one of the above types, or if the packet is from a node that is not to be "helped", the "NO" branch is taken to block 110 where the packet is transmitted. Control then passes back to block 106 to wait for the next packet.

If the packet is a DHCPDISCOVER or DHCPREQUEST packet, the rightmost "YES" branch is taken to decision block 112, which tests to see if the packets's B-flag is set. The function of the B-flag is defined in RFC 1541 as follows:

A client that cannot receive unicast IP datagrams until its protocol software has been configured with an IP address SHOULD set the BROADCAST bit (B-flag) in the 'flags' field to 1 in any DHCPDISCOVER or DHCPREQUEST messages that client sends. The B-flag will provide a hint to the DHCP server and BOOTP relay agent to broadcast any messages to the client on the client's subnet. A client that can receive unicast IP datagrams before its protocol software has been configured SHOULD clear the B-flag bit to 0. A server or relay agent sending or relaying a DHCP message directly to a DHCP client (i.e., not to a relay agent specified in the 'giaddr' field) SHOULD examine the B-flag. If the B-flag is set to 1, the DHCP message SHOULD be sent as an IP broadcast using an IP broadcast address (preferably 255.255.255.255) as the IP destination address and the link-layer (Ethernet) broadcast address as the link-layer (Ethernet) destination address. If the B-flag is cleared to 0, the message SHOULD be sent as an IP unicast to the IP address specified in the "YIADDR" field and the link-layer (Ethernet) address specified in the "CHADDR" field. If unicasting is not possible, the message MAY be sent as an IP broadcast using an IP broadcast address (preferably 255.255.255.255) as the IP destination address and the link-layer (Ethernet) broadcast address as the link-layer (Ethernet) destination address.

Some switches are capable of trapping and processing both unicast and broadcast packets. A switch of this type may skip blocks 112 and 114 and transmit the packet at block 110 the B-flag cleared at block 110. However, other switches are only capable of trapping broadcast packets or packets that are addressed directly to a switch MAC address. For a switch of this type, it is important that all packets involved in the configuration dialog be Ethernet broadcast packets so that the switch's CPU will be able to intercept the packets.

Initial DHCPDISCOVER and DHCPREQUEST packets are typically Ethernet broadcast packets because the client will usually not know the IP address of the DHCP server. However, if the client can receive unicast IP datagrams before being configured with an IP address, the client may set the B-flag and the DHCP server may use B-flag as a hint when deciding how to transmit responses to the node. If the flag is cleared, DHCPOFFER, DHCPACK, and DHCPNAK packets may be unicast back to the node, thereby not allowing agent 102 to intercept the packets if the switch cannot trap unicast packets. It is likely that the B-flag is already set since many nodes are unable to receive unicast IP datagrams until configured with an IP address. If the B-flag is set, the "YES" branch is taken to block 110, the packet is transmitted, and control passes back to block 106 to wait for the next packet. If the flag is cleared, the "NO" branch is taken to block 114, the packet's B-flag is set, and the Ethernet checksum is recalculated. Control then passes to block 110, the packet is transmitted, and control passes back to block 106 to wait for the next packet.

Returning to decision block 108, if the packet is a DHCPOFFER or DHCPACK packet, the lower "YES" branch is taken to block 116. Block 116 copies the candidate IP address from the YIADDR field to the default gateway field in the options field, thereby configuring the network node to be its own gateway, and recomputes the packet checksum. Control then passes to block 110, the packet is transmitted, and control passes back to block 106 to wait for the next packet.

A primary advantage of this embodiment of the present invention is that it is simple to implement and requires little overhead. However, this embodiment does have a few minor limitations. With respect to switches unable to intercept unicast packets, when the node seeking to be configured knows the address of the DHCP server, the node may use that address to unicast the DHCPDISCOVER and DHCPREQUEST packets. Since the initial DHCP packets are not broadcast, the DHCP snoopy agent does not see them and therefore cannot set the B-flag. However, in most implementations of the DHCP protocol, the node seeking to be configured does not know the address of the DHCP server, thereby ensuring that the initial DHCP packets are not broadcast.

A similar difficulty may occur when a network node seeks to renew the lease on its IP address. Since the node knows the address of the DHCP server, the node will typically unicast a DHCPREQUEST packet to the server. A DHCP snoopy agent residing, on a switch that is unable to intercept unicast packets will transmit this message directly to the server without having the opportunity to set the B-flag. Since the client is configured with an IP address and is therefore able to receive a unicast IP datagram, the client will most likely clear the B-flag and the DHCP server will most likely respond with unicast messages. The DHCP server may not approve of the modified default gateway address, and may abort or may attempt to restore the default gateway address to the address it believes is correct. Since the messages are unicast to the client, the DHCP snoopy agent will not have the opportunity to modify the default gateway address. Accordingly, without modifying the DHCP server, this embodiment may have difficulty supporting dynamic address allocation on switches unable to intercept unicast packets. While, the DHCP server may be modified to use the default gateway provided by the client, one of the primary advantages of the present invention is that it works with prior art DHCP servers. Of course, switches capable of intercepting unicast packets will not be affected.

Another minor disadvantage is that setting the B-flag may cause network traffic to increase slightly in configurations that would otherwise leave the B-flag clear. In spite of these minor disadvantages, the DHCP snoopy agent provides an effective and easy to configure solution for many networks wherein a network administrator wishes to configure nodes to be their own gateways using a prior art automatic configuration protocol, such as DHCP or BOOTP.

Figure 6:
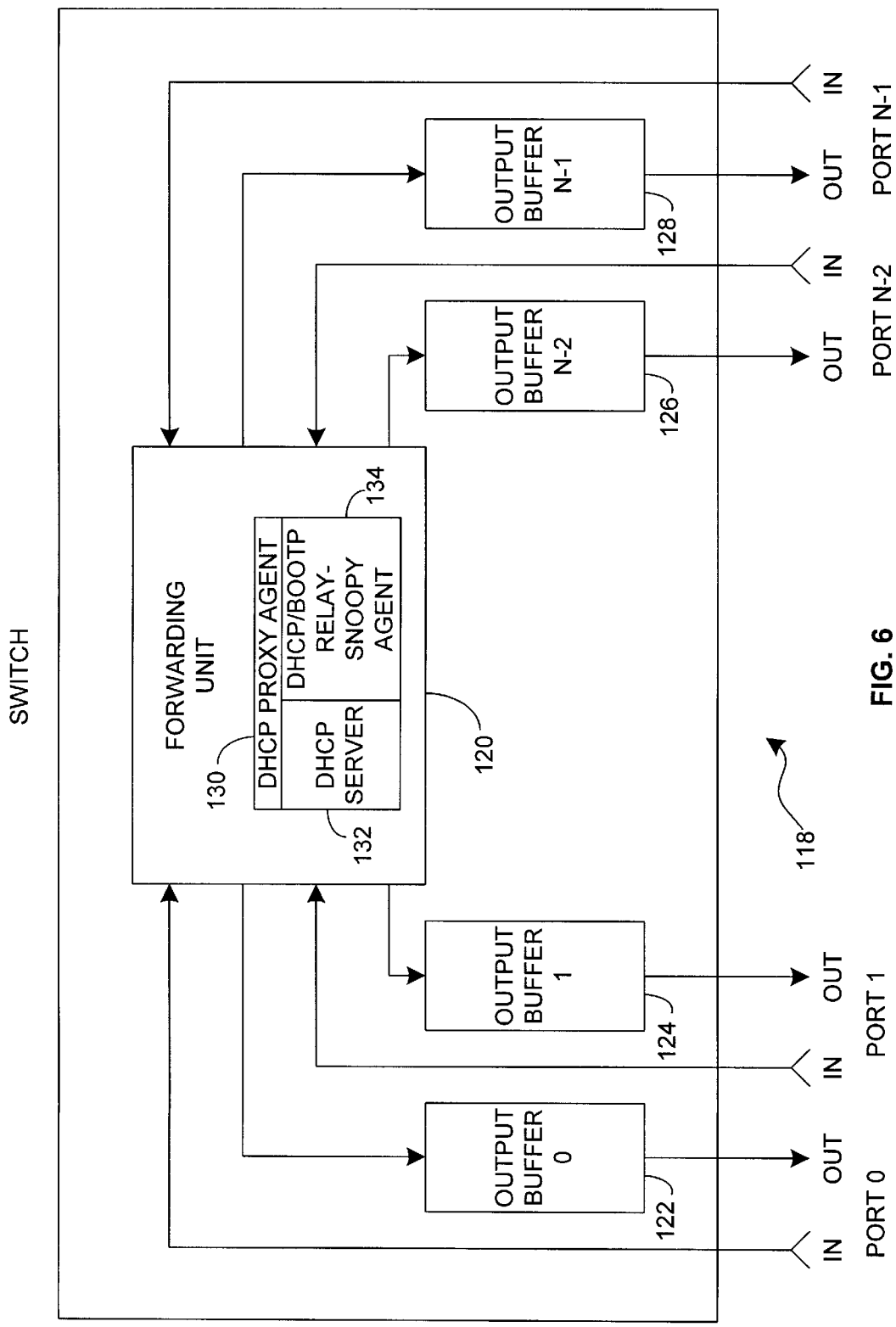
FIG. 6 shows an N-port switch in accordance with the second embodiment of the present invention wherein the configuration agent is a DHCP proxy agent.

The second embodiment of the present invention does not suffer from these minor disadvantages. FIG. 6 shows an N-port switch 118 in accordance with the second embodiment of the present invention. Each port has an input path to forwarding unit 120, and an output path that includes an output buffer, such as output buffers 122, 124, 126, and 128. Furthermore, forwarding unit 120 includes a DHCP proxy agent 130. Proxy agent 130 is configured to appear to nodes seeking to be configured as DHCP server 132. In addition, DHCP/BOOTP relay-snoopy agent 134 of DHCP proxy agent 130 is configured to appear to DHCP servers as DHCP/BOOTP relay agent if the DHCP server is not on the same subnet. If the client to be configured and the DHCP server are on the same subnet, DHCP/BOOTP relay-snoopy agent 134 functions as a snoopy agent (similar to the first embodiment) for packets transmitted from the DHCP server to the client. Except as discussed below, forwarding unit 120 forwards packets in a manner known in the prior art.

FIGS. 7–10, taken collectively, are a flowchart 136 that illustrates how DHCP proxy agent 130 processes packets. At block 138, a packet is received. Control then passes to decision block 140, which determines whether the packet is a DHCPDISCOVER, DHCPREQUEST, DHCPOFFER, DHCPACK, or DHCPNAK packet specifying a network node to be configured as its own gateway. Similar to DHCP snoopy agent 102 as described above, proxy agent 120 can also be configured to maintain a table of MAC addresses identifying network nodes that are to be "helped". If the packet is not one of these packets, or the node is not configured to be "helped", the "NO" branch is taken to block 142, where the packet is transmitted. Control then passes back to block 138 to wait for the next packet to be received. Note that DHCP proxy agent 130 is configured to receive all broadcast packets transmitted in the configuration dialogue. In addition, if any of the packets are from the client are unicast, agent 130 will also receive those packets since the client seeking to be configured will believe that agent 130 is its DHCP server, as described in greater detail below.

Figure 8:
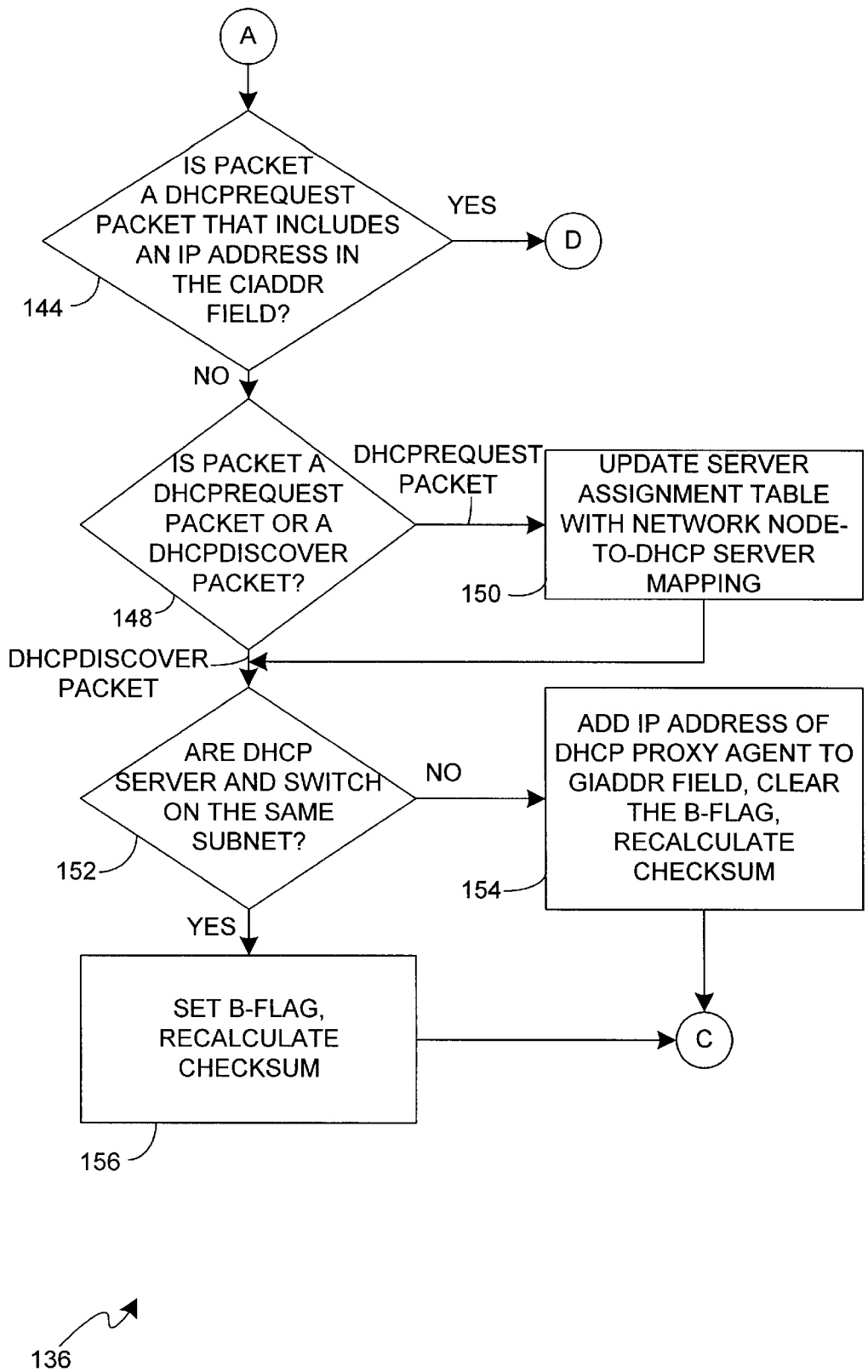

If the packet is a DHCPDISCOVER or DHCPREQUEST packet, the rightmost "YES" branch is taken to decision block 144 in FIG. 8 via label A. Decision block 144 determines whether the packet is a DHCPREQUEST packet that includes an IP address in the CIADDR field. As shown above in Table 1, the CIADDR field in a DHCPREQUEST packet is filled in by the client node if the client node is seeking to verifying previously allocated configuration parameters. This process is known in the art as lease renewal. If the packet is a DHCPREQUEST packet that includes an IP address in the CIADDR field, the "YES" branch is taken to decision block 145 in FIG. 10 via label D.

Decision block 145 determines whether the DHCP server and the switch are on the same subnet. This can be determined by having DHCP proxy agent 130 be configured by a DHCP server, or the switch can learn dynamically about its presence when it receives any DHCP responses. If the DHCP server and the switch are on the same subnet, control passes to block 146. Block 146 first accesses a server assignment table. The server assignment table maintains correspondence between clients previously configured and the DHCP servers that provided the configuration information. Note that the server assignment table is not necessary in networks having only one DHCP server. Entries are stored in the table when DHCPACK and DHCPREQUEST packets are processed, as described below.

Block 146 retrieves the address of the DHCP server that configured the client from the server assignment table. Since the server and client are on the same subnet, the address can be a MAC address, or an IP address (which is converted to a MAC address using the ARP). Next, block 146 re-addresses the packet to the MAC address of the retrieved DHCP server. Block 146 then sets the B-flag (if not already set), thereby ensuring, that the DHCP server responds with broadcast messages that are intercepted in a manner similar to the first embodiment described above. Finally, the packet checksum is recalculated and control passes back to block 142 in FIG. 7 via label C.

Figure 10:
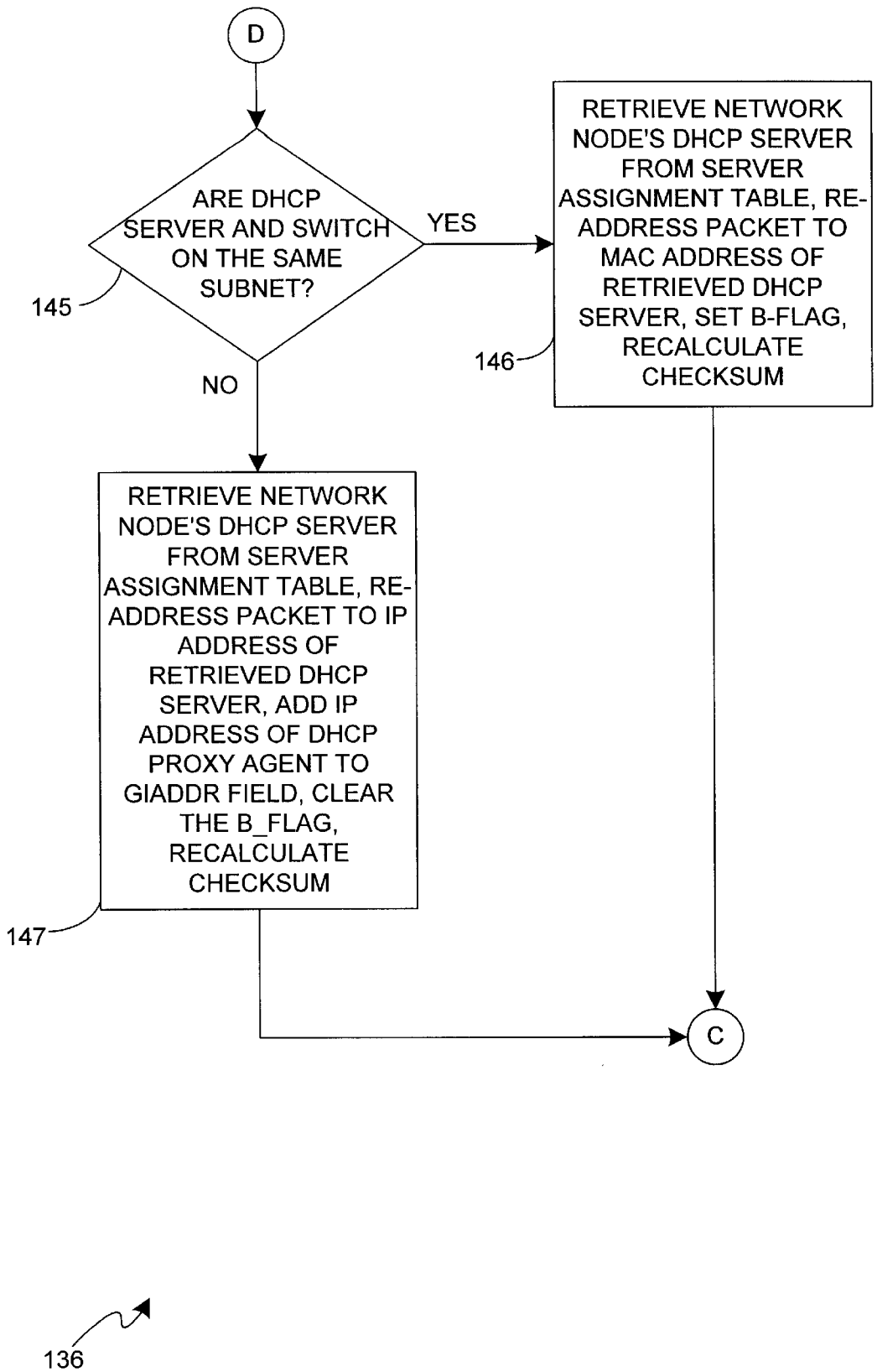

Returning to decision block 145 in FIG. 10, if the DHCP server and the switch are not on the same subnet, control passes to block 147. As above, block 147 access the server assignment table and retrieves the IP address of the DHCP server that configured the client long with the default gateway address provided by the server. Block 147 then re-addresses the packet to the IP address of the DHCP server, adds the IP address of DHCP proxy agent 130 to the GIADDR field, clears the B-flag (if not already cleared), and recalculates checksum. By adding the IP address of DHCP proxy agent 130 to the GIADDR field and clearing the B-flag, agent 130 appears as a DHCP/BOOTP relay agent to the DHCP server, and return packets are unicast back to agent 130. Control then passes back to block 142 in FIG. 7 via label C, where the packet is transmitted to the DHCP server via the default gateway of DHCP proxy agent 130. Control then passes to block 138 to wait for the next packet.

Returning to decision block 144 in FIG. 8, if the packet is not a DHCPREQUEST packet that includes an IP address in the CIADDR field, the "NO" branch is taken to decision block 148. Decision block 148 determines whether the packet is a DHCPREQUEST packet (which of course would not have an address in the CIADDR field because if it did, the "YES" branch would be taken at decision block 144) or a DHCPDISCOVER packet. If it is a DHCPREQUEST packet, the packet contains parameters that have been requested by the node seeking to be configured and the "DHCPREQUEST PACKET" branch is taken to block 150. Block 150 updates the server assignment table with the proposed network node-to-DHCP server mapping. This table is used when client seeks to renew its lease on an IP address via a DHCPREQUEST packet, as explained above with reference to FIGS. 8 and 10. Control then passes to decision block 152. Returning to decision block 148, if the packet is a DHCPDISCOVER packet, control also passes to decision block 152 via the "DHCPDISCOVER PACKET" branch.

Decision block 152 determines of the DHCP server and the switch are on the same subnet. This can be determined as described above with reference to step 145 in FIG. 10. If the switch and the DHCP server are not on the same subnet, the "NO" branch is taken to block 154. Block 154 inserts the IP address of DHCP proxy agent 130 into the GIADDR field, thereby making agent 130 appear to the DHCP server as a DHCP/BOOTP relay agent. Block 30 then clears the B-flag (if not already cleared), thereby requesting unicast transmission. This conserves network bandwidth. Next, the packet is addressed with the IP address of a DHCP server. Since agent 130 is acting as a DHCP/BOOTP relay agent with respect to the off-subnet DHCP server, agent 130 may use the same prior art techniques to maintain lists of available DHCP server, such as manual configuration of DHCP server addresses of discovering DHCP servers dynamically by examining response packets. Finally, the packet checksum is recalculated, and control passes back to block 142 in FIG. 7 via label C, where the packet is transmitted via the default gateway of agent 130. Control then passes to block 138 to wait for the next packet.

Returning to decision block 152, if the DHCP server and the switch are on the same subnet, the "YES" branch is taken to block 156. Block 156 sets the B-flag, thereby requesting broadcast transmission from the DHCP server, and recalculates the checksum if the B-flag had been cleared. Control then passes back to block 142 in FIG. 7 via label C, where the packet is transmitted. Then control passes to block 138 to wait for the next packet.

Figure 7:
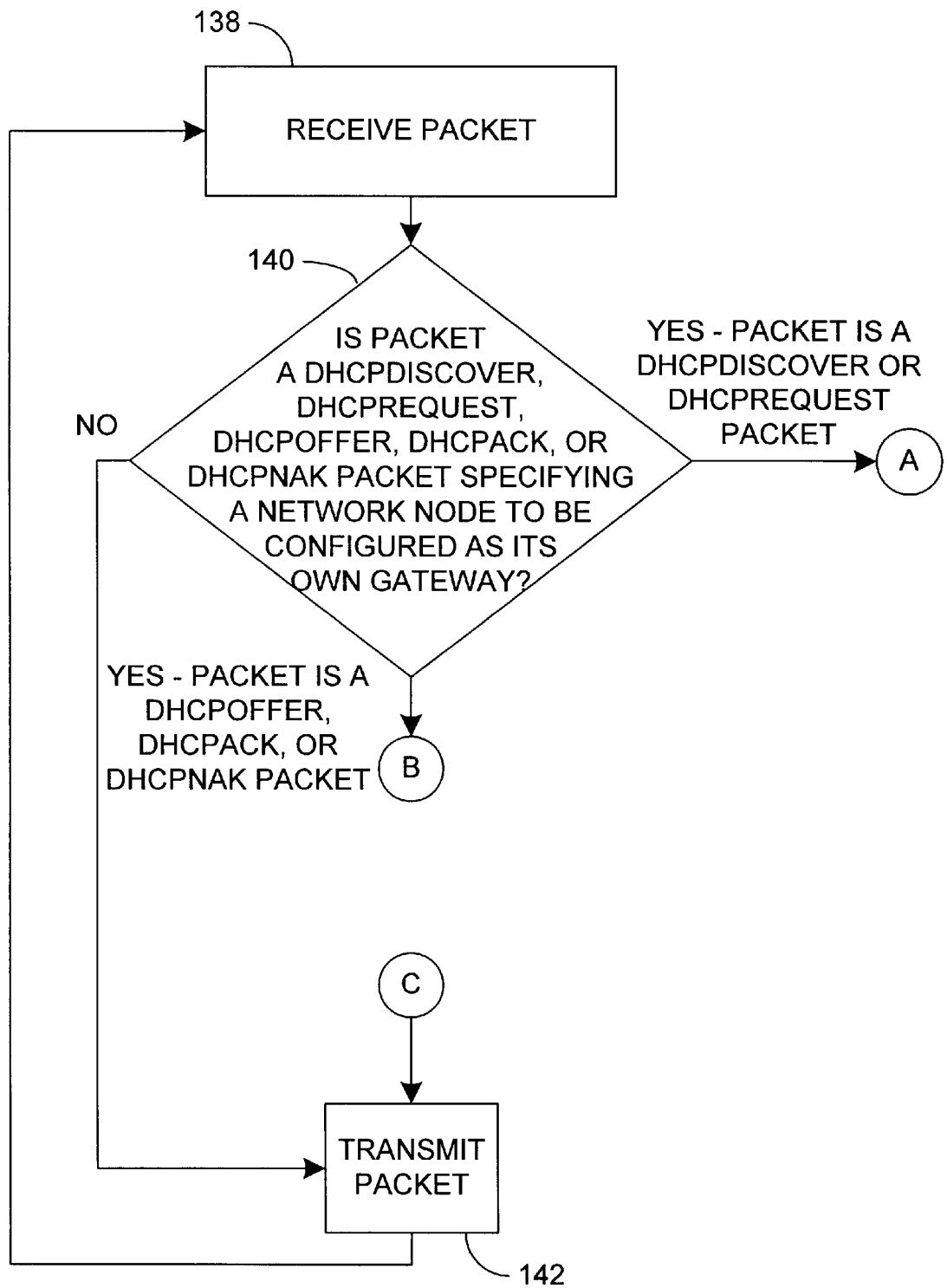
FIGS. 7–10, taken collectively, are a flowchart illustrating how the DHCP proxy agent of FIG. 6 processes packets.
Figure 9:
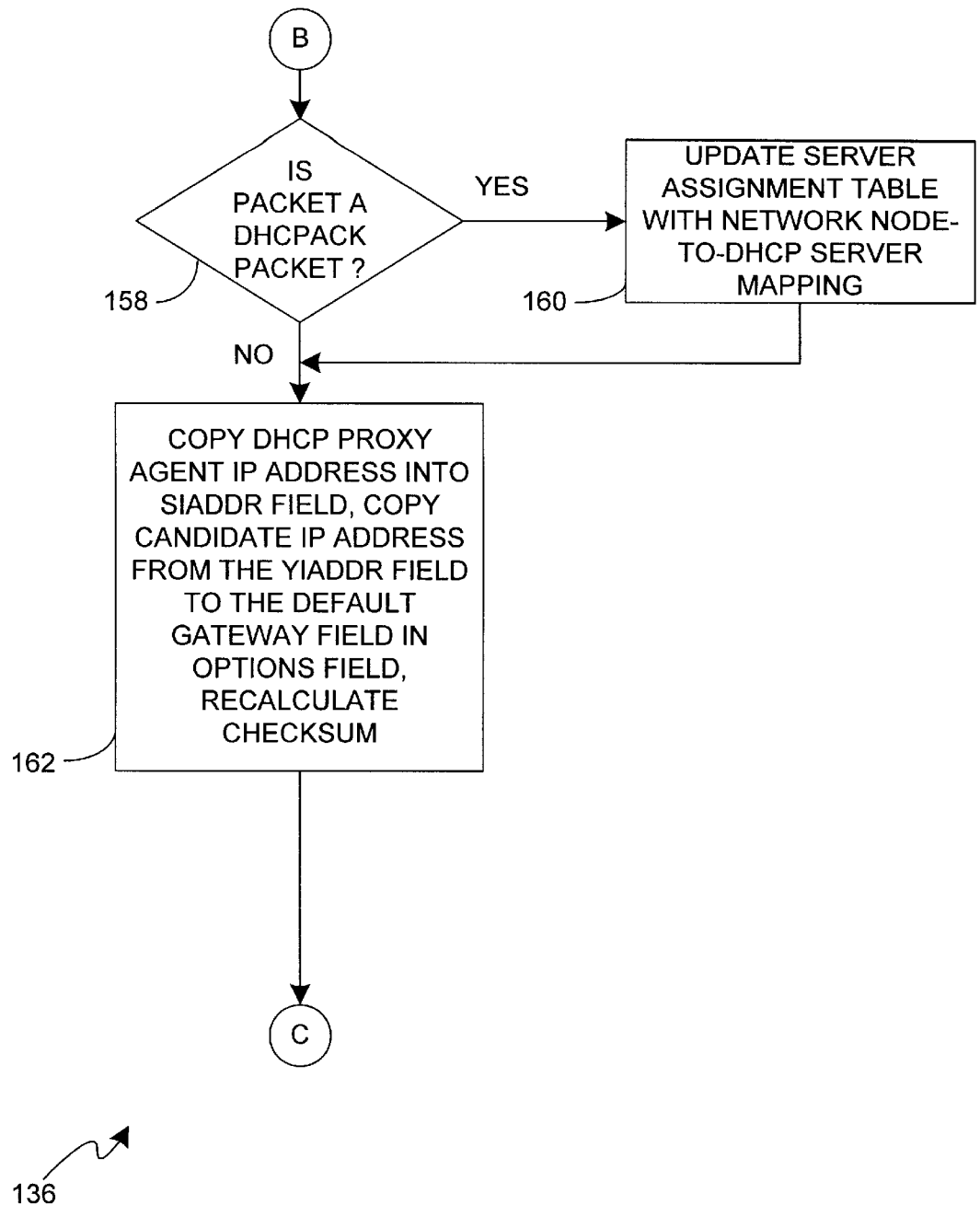

Returning to decision block 140 in FIG. 7, if the packet is a DHCPOFFER, DHCPACK, or DHCPNAK packet from a network that is configured to be "helped", the lower "YES" branch is taken to decision block 158 in FIG. 9 via label B. Block 158 determines whether the packet is a DHCPACK packet. If it is, the packet contains configuration information and the "YES" branch is taken to block 160, which updates the server assignment table with the network node-to-DHCP server mapping similar to step 150 in FIG. 8. Control then passes to block 162. In addition, if the packet is not a DHCPACK packet, control also passes to block 162.

Block 162 copies the IP address of DHCP proxy agent 132 to into the SIADDR field, thereby causing the network node seeking to be configured to treat agent 132 as its DHCP server. Block 162 then clears the GIADDR field so that agent 132 does not appear to the client node to be a DHCP/BOOTP relay agent. Next, the candidate IP address is copied from the YIADDR field to the default gateway field in the options field, thereby configuring the node to be its own gateway. Finally, the packet checksum is recalculated and control then passes back to block 142 in FIG. 7 via label C, where the packet is transmitted to the client to be configured. Then control passes to block 138 to wait for the next packet.

The second embodiment of the present invention provides a comprehensive solution for network administrators seeking to maintain prior art DHCP servers while also supporting all aspects of the DHCP message dialogue, including lease renewal and unicast transmissions. In addition, the second embodiment of the present invention is fully functional when used with switches capable of intercepting only broadcast packets.

By allowing a network node to be automatically configured as its own gateway, both embodiments of the present invention allow a network administrator to expand a network by adding switches and bridges while maintaining automatic configuration, and without significantly increasing traffic routed to routers. Switches and bridges are much faster and less expensive than routers, so the present invention provides a network administrator with the opportunity to minimize the cost of expanding a network, maximize the speed of the network, and maintain automatic configuration.

In the prior art, a network administrator had three choices when expending a network by adding switches or bridges. First, the administrator could alter the subnet mask. This choice allowed automatic configuration, but IP addresses had to be added to the subnet in powers of two, which is often not practical. Second, the network administrator could manually configure each client to be its own default gateway, which is not a very appealing prospect if the administrator has already undertaken the cost of establishing an automatic configuration protocol, such as DHCP. Finally, the network administrator could use routers, which are expensive and slow. The present invention provides a fourth choice. In accordance with the present invention, a configuration agent allows any increment of IP addresses to be added to a subnet without having to perform manual configuration and without resorting to routers.

Although the present invention has been described with reference to preferred embodiments, workers skilled in the art will recognize that changes may be, made in form and detail without departing from the spirit and scope of the invention.

What is claimed is:

1. A method of configuring a client to be its own default gateway comprising:

intercepting a message that is part of a configuration dialogue between a configuration server and the client, wherein the message includes a default gateway address that will be or is being used by the client;

modifying the default gateway address in the message to be an address of the client; and transmitting the message.

2. The method of claim 1 wherein the message is an offer message.

3. The method of claim 1 wherein the message is an acknowledge message.

4. The method of claim 1 wherein;

intercepting a message comprises:
 receiving the message from the configuration server; and
transmitting the message comprises:
 transmitting the message to the client.

5. The method of claim 1 wherein modifying the default gateway address comprises:

copying a candidate network address that will be or is being used as the network address of the client from a client network address field of the message; and storing the candidate address in a default gateway address field of the message.

6. The method of claim 5 and further comprising:

recalculating a checksum associated with the message.

7. The method of claim 1 and further comprising:

intercepting a discover message or a request message that is part of the configuration dialogue between the configuration server and the client;

examining the discover message or the request message to determine if a broadcast flag of the discover message or the request message is set;

setting the broadcast flag if the broadcast flag was not set;

recalculating a checksum associated with the discover message or the request message; and transmitting the discover message or the request message.

8. The method of claim 1 and further comprising:

storing a network address of a configuration agent into a configuration server address field of the message.

9. The method of claim 1 and further comprising:

determining whether the message is an acknowledge message; and storing an entry in a server assignment table that correlates the client and the configuration server if the message is an acknowledge message.

10. The method of claim 1 and further comprising:

intercepting a request message that includes a network address for which the client seeks to renew a lease;

readdressing the request message to an address of the configuration server; and transmitting the request message to the configuration server.

11. The method of claim 10 and further comprising:

determining whether a configuration agent and the configuration server are on a same subnet;

if the configuration agent and the configuration server are on the same subnet;
 setting a broadcast flag of the request message if the broadcast flag is not set; and
 recalculating a checksum associated with the request message;
 wherein readdressing the request message to an address of the configuration server comprises readdressing a hardware address of the request message to a hardware address of the configuration server; and if the configuration agent and the configuration server are not on the same subnet;
 clearing a broadcast flag of the request message if the broadcast flag is not clear;
 storing a network address of the configuration agent in a relay agent field of the request message; and
 recalculating a checksum associated with the request message;
 wherein readdressing the request message to an address of the configuration server comprises readdressing a network address of the request message to a network address of the configuration server.

12. The method of claim 10 wherein readdressing the request message to an address of the configuration server comprises:

accessing a server assignment table to determine an address of a configuration server previously associated with the client;

readdressing the request message to the address of the configuration server previously associated with the client.

13. The method of claim 1 and further comprising:

intercepting a discover message or a request message that is part of the configuration dialogue between the configuration server and the client;

determining whether a configuration agent and the configuration server are on a same subnet;

if the configuration agent and the configuration server are on the same subnet;

setting a broadcast flag of the discover message or the request message if the broadcast flag is not set;

recalculating a checksum associated with the discover message or the request message; and transmitting the discover message or the request message, if the configuration agent and the configuration server are not on the same subnet;

clearing a broadcast flag of the discover message or the request message if the broadcast flag is not clear;

storing a network address of the configuration agent in a relay agent field of the discover message or the request message;

recalculating a checksum associated with the discover message or the request message; and transmitting the discover message or the request message.

14. A network device comprising:

a first port coupled to a configuration server capable of configuring a client with a default gateway address;

a second port coupled to a client seeking to be configured with a default gateway address;

a forwarding unit coupled between the first and second ports, for forwarding packets between the first and second ports, the forwarding unit including:

a configuration agent that intercepts a configuration packet that is part of a configuration dialog between the configuration server and the client, wherein the configuration packet contains a default gateway address to be used by the client, and tile configuration agent modifies the default gateway address to be a network address of the client, and transmits the configuration packet.

15. The network device of claim 14 wherein the configuration packet includes an offer message.

16. The network device of claim 14 wherein the configuration packet includes an acknowledge message.

17. The network device of claim 14 wherein the configuration agent intercepts the configuration packet by receiving the configuration packet from the configuration server at the first port, and transmits the configuration packet by transmitting the configuration packet to the client at the second port.

18. The network device of claim 14 wherein the configuration agent modifies the default gateway address to be used by the client by copying a candidate network address that will be or is being used as a network address of the client from a client network address field of the configuration packet and storing the candidate address in a default gateway address field of the configuration packet.

19. The network device of claim 14 wherein the configuration agent recalculates a checksum associated with the configuration packet before transmitting the configuration packet.

20. The network device of claim 14 wherein the configuration agent also intercepts a packet that includes a discover message or a request message that is part of the configuration dialogue between the configuration server and the client, examines the packet that includes the discover message or the request message to determine if a broadcast flag of the packet that includes the discover message or the request message is set, sets the broadcast flag if the broadcast flag was not set, recalculates a checksum associated with the packet that includes the discover message or the request message, and transmits the packet that includes the discover message or the request message.

21. The network device of claim 14 wherein the configuration agent also stores a network address of the configuration agent into a configuration server address field of the configuration packet.

22. The network device of claim 14 wherein the configuration agent also determines whether the configuration packet includes an acknowledge message and stores an entry in a server assignment table that correlates the client and the configuration server if the configuration packet includes an acknowledge message.

23. The network device of claim 14 wherein the configuration agent also intercepts a packet that includes a request message that contains a network address for which the client seeks to renew a lease, readdresses the packet that includes the request message to an address of the configuration server, and transmits the packet that includes the request message to the configuration server.

24. The network device of claim 23 wherein the configuration agent also determines whether the configuration agent and the configuration server are on a same subnet, and if the configuration agent and the configuration server are on the game subnet, the configuration agent sets a broadcast flag of the packet that includes the request message if the broadcast flag is not set and recalculates a checksum associated with the, packet that includes the request message, with the packet that includes the request message being readdressed to a hardware address of the configuration server, and if the configuration agent and the configuration server are not on the same subnet, the configuration agent clears a broadcast flag of the packet that includes the request message if the broadcast flag is not clear, stores a network address of the configuration agent in a relay agent field of the packet that includes the request message, and recalculates a checksum associated with the packet that includes the request message, with the packet that includes the request message being readdressed to a network address of the configuration server.

25. The network device of claim 23 wherein the configuration agent readdresses the packet that includes the request message to an address of the configuration server by accessing a server assignment table to determine an address of a configuration server previously associated with the client, and readdressing the packet that includes the request message to the address of a configuration server previously associated with the client.

26. The network device of claim 14 wherein the configuration agent also intercepts a packet that includes a discover message or a request message that is part of the configuration dialogue between the configuration server and the client, and determines whether the configuration agent and the configuration server are on a same subnet, and if the configuration agent and the configuration server are on the same subnet, the configuration agent sets a broadcast flag of the packet that includes the discover message or the request message if the broadcast flag is not set, recalculates a checksum associated with the packet that includes the discover message or the request message, and transmits the packet that includes the discover message or the request message, and if the configuration agent and the configuration server are not on the same subnet, the configuration agent clears a broadcast flag of the packet that includes the discover message or the request message if the broadcast flag is not clear, stores a network address of the configuration agent in a relay agent field of the packet that includes the discover message or the request message, recalculates a checksum associated with the packet that includes the discover message or the request message, and transmits the packet that includes the discover message or the request message.

* * * * *